C. H. ORTMAN.
SELF-LUBRICATING BOLT.
APPLICATION FILED NOV. 26, 1920.
1,428,252.
Patented Sept. 5, 1922.
3 SHEETS—SHEET 1.
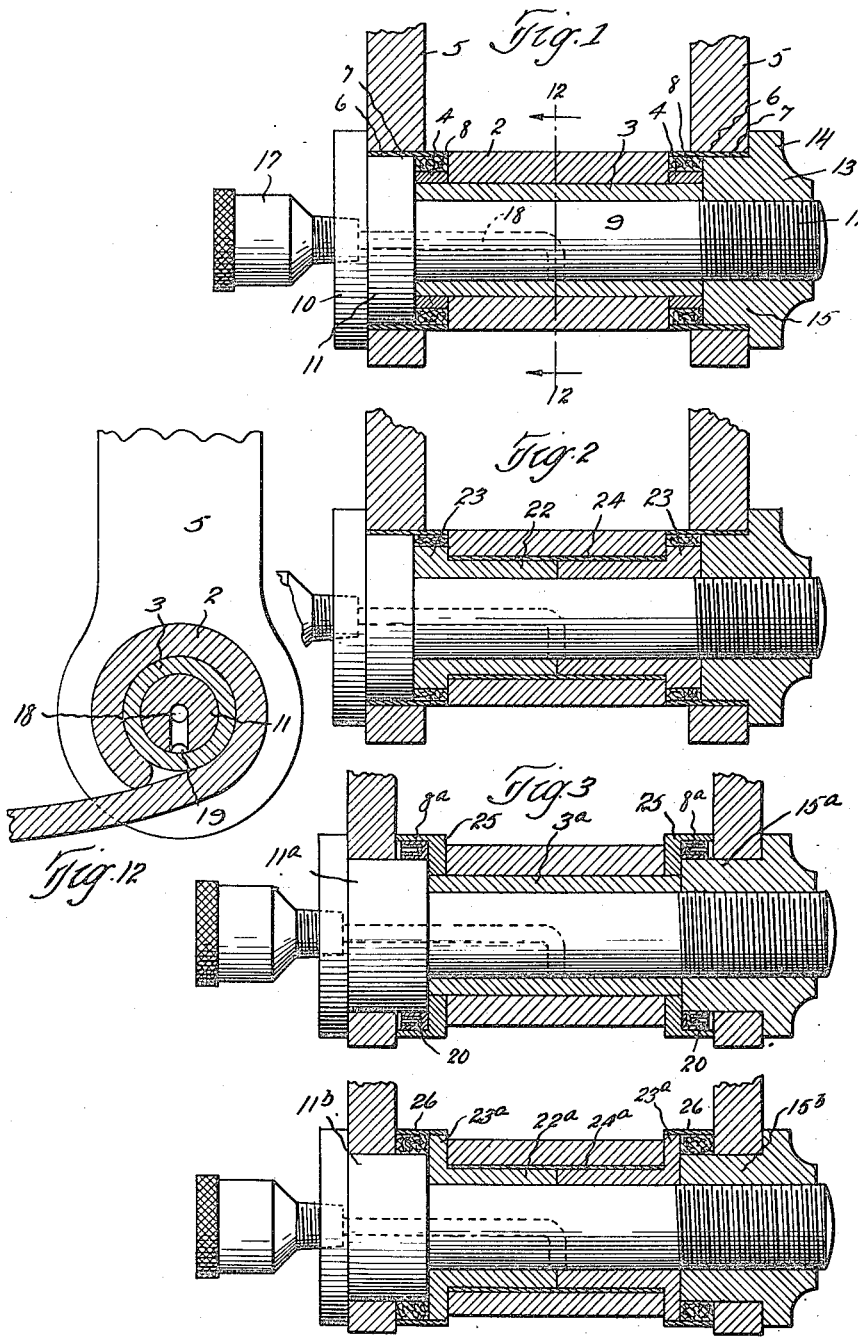

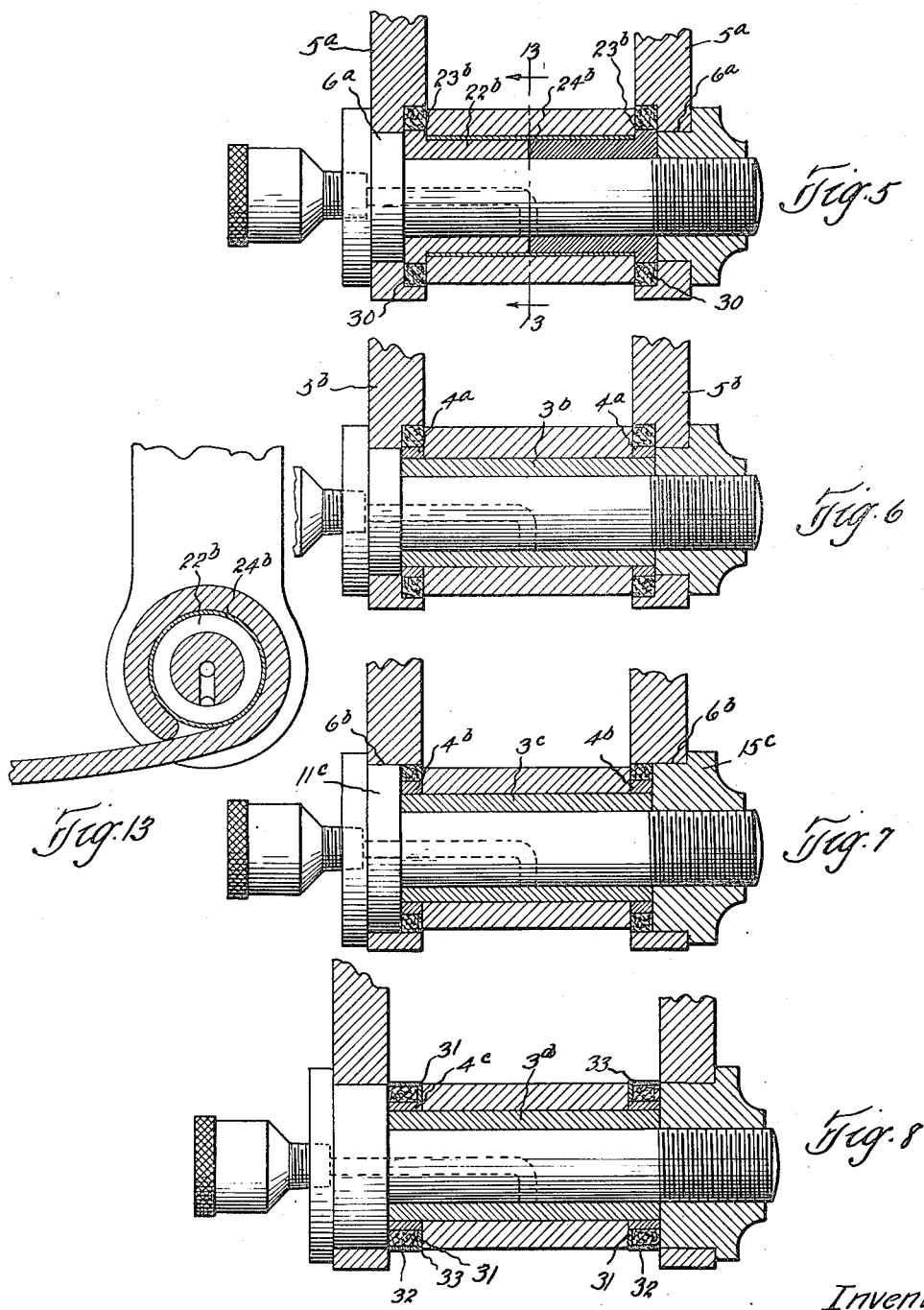

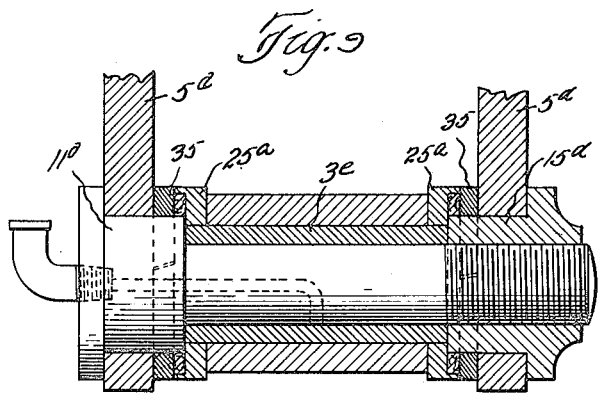
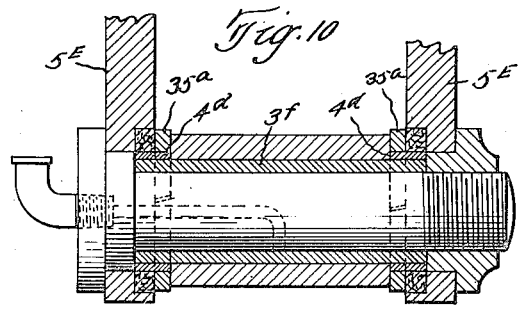
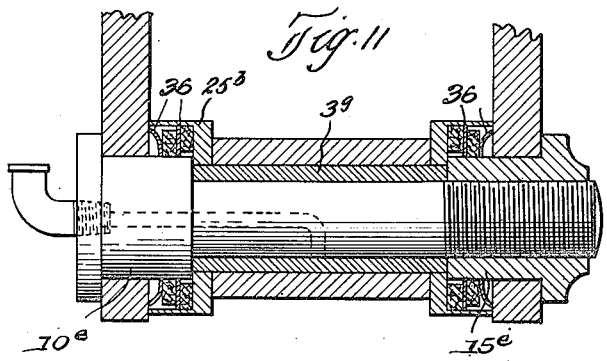

Patented Sept. 5, 1922.

1,428,252

UNITED STATES PATENT OFFICE.

CHARLES H. ORTMAN, OF CLEVELAND, OHIO.

SELF-LUBRICATING BOLT.

Application filed November 26, 1920. Serial No. 426,383.

*To all whom it may concern:*

Be it known that I, CHARLES H. ORTMAN, a citizen of the United States, residing at Cleveland, in the county of Cuyahoga and State of Ohio, have invented a certain new and useful Improvement in Self-Lubricating Bolts, of which the following is a full, clear, and exact description, reference being had to the accompanying drawings.

This invention relates to self lubricating bolts and is directed more particularly to shackle bolts for use in connection with automobile springs.

Some of the objects of the present invention are, to provide a bolt which shall be so constructed as to retain the lubricant between the bolt and bushing and prevent leakage about the ends thereof; to provide a bolt which shall be simple in construction, efficient in operation and inexpensive to manufacture, while further objects and advantages will appear as the description proceeds.

In the accompanying drawings wherein I have shown various illustrative embodiments of my invention, Fig. 1 is a sectional view of a shackle bolt constructed in accordance with my invention; Figs. 2-11 are similar views illustrating modified forms of my invention and Figs. 12 and 13 are sectional views taken on the lines 12—12 and 13—13 respectively of Figs. 1 and 5.

Describing by reference characters the various parts illustrated, and referring particularly to Figs. 1 and 12, 1 indicates the end portion of a spring which is formed with the usual eye 2. A bushing 3 is positioned in said eye and projects on each side thereof as shown in Fig. 1. Each protruding end of said bushing is fitted with a ring 4 which is of a width substantially equal to the length of that portion of the bushing which projects beyond the spring eye 2. The shackles 5—5 are each provided with a bore 6, which is preferably of a diameter substantially equal to the outer diameter of the spring eye 2 so that a thimble 7 fitted into said bore and abutting said eye will lie flush with the outer surface thereof. The space between the thimble 7 and ring 4 is packed with any suitable packing material indicated at 8. A bolt 9 is journalled in the bushing 3 and is formed at one end with a head 10 and a collar 11 which fits snugly within a thimble 7 and abuts the end of bushing 3, ring 4 and packing 8, while the other end of said bolt is threaded as indicated at 12.

A nut 13 having a head 14 and a reduced collar 15, is threaded on said bolt in such manner as to position the portion 15 within the other thimble 7 and form a tight joint with the bushing 3, ring 4 and packing 8. Lubricant is injected to the bearing surface of the bolt and bushing through a suitable cup 17 which is connected therewith by a bore 18 and a channel 19 (Fig. 12) formed longitudinally of the bolt body 11.

Fig. 2 illustrates a modified form of my invention, in which a split bushing 22 is employed, each half of which, is formed with a head portion 23 which eliminates the ring 4 described in connection with Fig. 1. A sleeve 24 is inserted between the bushing and the spring eye to prevent the lubricant from leaking by the joint formed by the abutting ends of said bushing. The construction of the remaining elements is identical with that previously described.

A further modification is shown in Fig. 3, wherein the bushing 3ª is projected on each side of the spring eye a sufficient distance to form a seat for the cups 25—25. The packing material 8ª is inserted in the cups about the elongated collars 11ª and 15ª of the bolt and nut and a spring washer 20 serves to retain said packing in light relationship above the parts.

In Fig. 4 I have shown a split bushing 22ª, each half of which is formed with an enlarged head 23ª which serves as support for the thimbles 26—26 fitted therein. The packing material is inserted between the thimbles 26 and collars 11ᵇ and 15ᵇ of the nut and bolt in a manner similar to that described in connection with Fig. 3. Since a split bushing is employed, I provide a sleeve 24ª between said bushing and spring eye to prevent loss of lubricant as set forth in connection with Fig. 2.

A still further modification is shown in Figs. 5 and 12 wherein a split bushing 22ᵇ is formed at each end with an integral head 23ᵇ. In the present instance the shackles 5ª—5ª are provided each with the usual bore 6ª and also with a recess 30 of a diameter substantially equal to that of the spring eye. The packing material is inserted between the heads 23ᵇ of the split bushing and the peripheral wall of the recess 30. A sleeve 24ᵇ is inserted between the bushing and spring eye as described in connection with Figs. 2 and 4.

The construction shown in Fig. 6 illustrates an elongated bushing $3^b$ which is fitted with rings $4^a$—$4^a$ similar to that shown and described in connection with Fig. 1. In the present instance however the shackles $5^b$—$5^b$ are formed similar to those illustrated in Fig. 5 and the packing material is placed between said shackles and the rings $4^a$—$4^a$.

In Fig. 7 the shackles are formed with an enlarged bore $6^b$ and the collars $11^c$ and $15^c$ of the bolt and nut are preferably of an equal diameter, but of a width less than that of said shackles. A ring $4^b$ is fitted on each end of the bushing $3^c$ and the packing material is interposed between said rings and the shackle similar to the manner described in connection with Figs. 5 and 6.

Fig. 8 shows a modification in which the bushing $3^d$ and rings $4^c$ are similar to those described in connection with Figs. 1 and 7. In this form, however, a spring washer 31 is fitted on each ring and abuts the side wall of the spring eye. The packing material is disposed about the rings $4^c$ and the thimbles 32—32 fitted thereon hold it in place. The abutting edges of the thimbles and spring washers are preferably beveled as indicated at 33.

The form illustrated in Fig. 9 is provided with an elongated bushing $3^e$, the ends of which are fitted with cups $25^a$ which retain the packing material. In this form a split ring 35 is placed on each collar $11^d$ and $15^d$ of the bolt and nut, said rings being interposed between the shackles $5^d$ and the edge of the cups $25^a$ thus retaining the packing material within the cups.

The seal shown in Fig. 10 is formed by providing an elongated bushing $3^f$, the ends of which are fitted with rings $4^d$. In this form the shackles $5^e$ are recessed as described in connection with Figs. 5 and 6 and the packing material inserted in said recess. A split ring $35^a$ is snapped over each ring $4^d$ and serves to hold the packing in place.

In Fig. 11 the ends of the elongated bushing $3^g$ are fitted with cups $25^b$ which receive a number of layers of packing material, each layer being held by a spring washer 36. The collars $10^e$ and $15^e$ of the bolt and nut form a suitable support for said packing and washers.

The use of the term packing in connection with the various types of shackle bolts above described is used in its broadest sense and includes leather or any suitable form of packing material which may be found desirable.

Having thus described my invention, what I claim is:

1. In a shackle bolt, the combination with a bushing, of a bolt rotatably supported in said bushing, a collar located on said bolt adjacent the head thereof, a nut threaded on the opposite end of said bolt, a collar located adjacent said nut, a lubricating duct extending from the exterior of said device to the bearing surface of said bolt, and packing means adjacent each of said collars for preventing egress of said lubricant.

2. In a shackle bolt the combination with a bushing, of a bolt rotatably supported in said bushing, said bolt being formed with a head adapted to abut the outer face of a shackle, a collar located on said bolt adjacent said head, said collar being fitted into a bore in said shackle, a nut threaded on the end of said bolt and having a head abutting the outer face of a second shackle, a collar located adjacent said nut, said collar being fitted into a bore in said second shackle, means for injecting lubricant to the bearing surface of said bolt, and packing means adjacent each of said collars for preventing egress of said lubricant.

3. In a shackle bolt, the combination with a bushing, of a bolt rotatably supported in said bushing, a collar located on said bolt adjacent the head thereof, a nut threaded on the opposite end of said bolt, a collar located adjacent said nut, a lubricating duct extending from the exterior of said device to the bearing surface of said bolt, and packing material surrounding each of said collars preventing egress of said lubricant.

In testimony whereof, I hereunto affix my signature.

CHARLES H. ORTMAN.